United States Patent Office 2,980,207
Patented Apr. 18, 1961

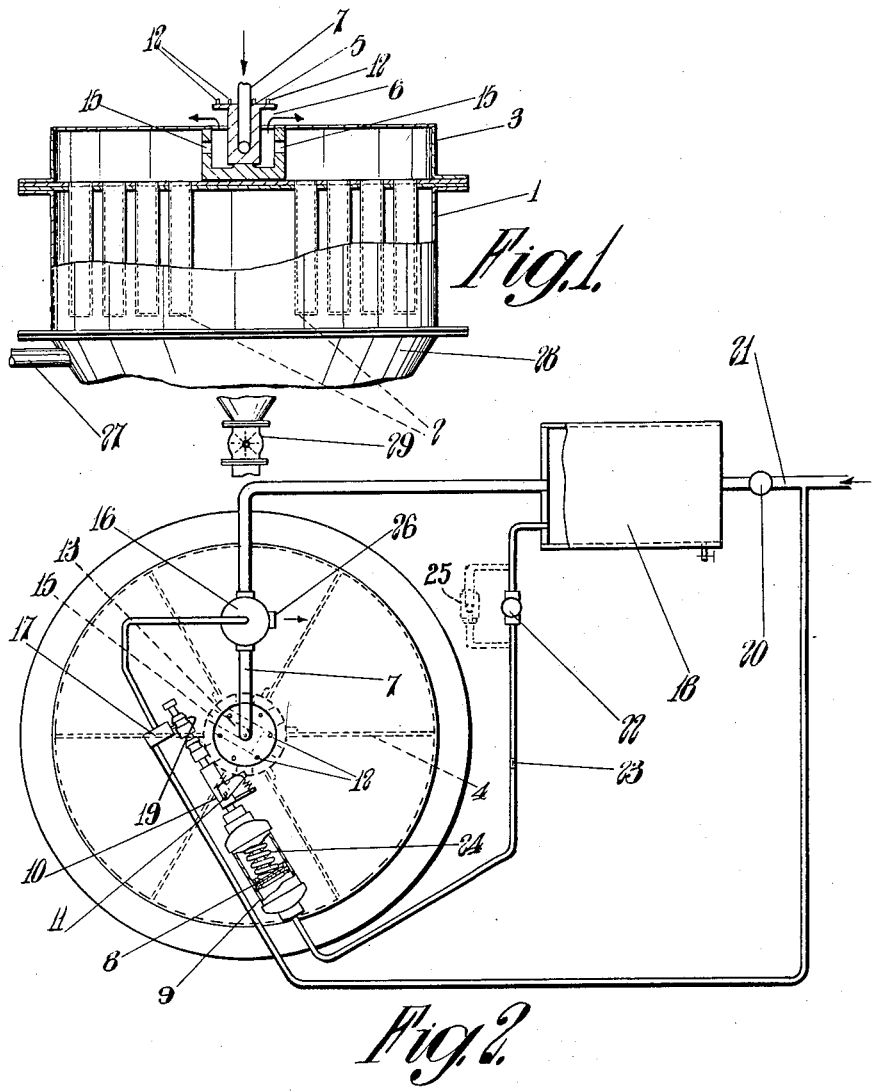

2,980,207
AIR FILTERS
Robert W. Allen, Hazel Grove, England, assignor to Henry Simon Limited, Stockport, England, a British company
Filed Sept. 15, 1958, Ser. No. 761,047
Claims priority, application Great Britain Sept. 26, 1957
8 Claims. (Cl. 183—57)

This invention relates to air filters of the type wherein the air for filtering is caused to pass through porous barriers such as the walls of sleeve members made from textiles or porous plastics or sintered metals and wherein it is arranged for the porous elements to be cleaned and freed of particles clogging the pores by periodically causing a flow of clean air to pass through the said porous barriers in the reverse direction to he normal operational air flow. The need for the total stoppage of filtering operations when element cleaning is taking place is avoided by sub-dividing the area of porous barrier associated with an equipment into sections (or groups of porous elements) any one of which may at will be isolated from the others by valve gear so that filtering operations may continue through all sections except that which is isolated and is therefore available for cleaning.

In air filters of the type described and where the air for filtering is drawn through the porous barried by suction it is common practice to arrange the valve gear so that the air used for cleaning is drawn from atmosphere or from the filtered outgoing air and caused to pass in a reverse-to-normal direction through an isolated section before it is drawn with the unfiltered air through the unaffected sections of the barrier in a normal operational manner, but where the air for filtering is under pressure a similar technique can only be employed when the cleaning air is derived from a source having a pressure valve in excess of that of the unfiltered air.

We have found by research and experiment that effective unclogging and cleaning of the porous filter elements by reverse-to-normal air flow methods can be most efficiently performed when the cleaning air is applied as a blast at comparatively high pressure for a period of relatively short duration, and this, coupled with the suitability of such pressure conditions for the pneumatic operation of valve gear mechanisms, forms the basis of the present invention, the object of which is to provide relatively inexpensive automatic means for the continuous cyclical cleaning of all sections of the porous barrier of an air filter unit.

In accordance with this invention such automatic means comprises an air storage reservoir connected with a source of comparatively high pressure air by a pipeline or the like incorporating a pre-determined constriction whereby the rate of growth of pressure within the reservoir can be regulated, associated with the said reservoir a pressure sensitive means arranged so that when the pressure within the reservoir reaches a predetermined level air is permitted to flow therefrom to a pressure operable driving device which causes the valve gear to isolate in turn each of the sections into which the porous elements are sub-divided, and an air cut-off valve which normally closes an air path from the reservoir to the isolating valve but which, on completion of the movement of the isolating valve gear, is caused to open to permit the stored air to escape from the reservoir through the isolated section of the porous elements, means also being provided to restore to normal the driving member of the isolating valve gear and its associated cut-off valve after the pressure in the reservoir has fallen to a predetermined level. The air cut-off valve may be arranged so that in its normal position it permits clean air from an isolated section to pass to the common exhaust for all sections. A preset or adjustable rate of flow restricting device may be provided between the pressure sensitive means associated with the reservoir and the pressure operable driving member to limit the speed of the driving member.

Referring to the accompanying drawings:

Figure 1 is a cross-sectional view of a filter unit and section isolating valve in accordance with the invention and, Figure 2 is a schematic view of the automatic means in accordance with the invention.

The filter unit shown comprises a chamber 1 housing a number of porous elements 2, the insides of the elements 2 opening to a manifold 3, which is subdivided by section plates 4 into six sections, each of which may be isolated from the other by a section isolating valve 5, which allows each section of the manifold to open direct to exhaust, as shown by arrows 6, except for the selected section which is connected to a clean air duct 7 for cleaning purposes, the term "exhaust" being understood to refer to atmosphere or a suitable receiving chamber having a duct leading thereto. Selection of the section whose elements 2 are to be cleaned is by rotational indexing of this valve 5. Unfiltered air is led into the unit through a duct 27 which may be integral with a hopper 28 in which impurities removed from the air by the filter elements are collected, and from which they are delivered by a pressure-tight rotary feeder 29.

The driving member of the isolating valve 5 employs a spring-returned, pneumatically-operated piston 8 which with its associated cylinder 9 is mounted adjacent to the isolating valve 5 and carries on a piston-rod extension 10 and actuating pawl 11 arranged to engage pegs 12 to move the end 13 of the clean air duct 7 of the valve 5 from one of the plurality of section isolating positions to the next in turn each time the piston 8 is pneumatically actuated. In each of the section isolating positions the clean air duct end 13, which is in connection via duct 7 with a known kind of pressure-operable two-way air cut-off valve 16, assumes coincidence with the sole outlet air port 15 of the selected section of the manifold 3 to that all air passing out of or into that section must pass through the air cut-off valve 16 which in its normal condition is spring-biased to provide an indirect path from a selected section to exhaust port 26 which may be connected by pipeline to a clean air receiving chamber if one is provided, all other sections being directly open to exhaust, as already mentioned. Operation of the air cut-off valve 16 is effected, under the control of a mechanically-operable, switch-forming pilot valve 17 of known kind which in its normal condition is spring-biased to close a path from the pressure source to the pressure-operable mechanism of the said air cut-off valve 16, but which is arranged so that when the piston 8 has moved to its pressure-driven extremity and after the isolating valve 5 has finished its movement from one position to the next, a cam element 19 of the piston-rod 10 causes the said pilot valve 17 to open to admit pressure to the operating mechanism of the air cut-off valve 16 so that it closes the throughway from the isolated section to exhaust and thereafter provides a condition where compressed air stored in a reservoir 18 is allowed to pass through clean air duct 7 into the isolating section, the cut-off valve 16 remaining in that condition until the piston 5 has completed its return stroke movement causing the cam 19 to disengage from the pilot valve 17 which closes thereby allowing the air cut-off valve 16 to be restored to normal. Although the air cut-off valve shown is of known pneumatically operated type and receives its actuating air supply from the main air pressure source via the pilot valve 17 which is controlled by a cam 19 associated with the piston rod 10, it may however be of electromagnetically operated type controlled by switch gear in a similar manner, or of mechanically operated type similiarly controlled by linkage.

In operation the pressure in the reservoir 18 increases at a slow rate, as regulated by a manually adjustable control valve (or preset constriction) 20 connected with the pressure supply through pipeline 21, until it (18) reaches the pressure at which it will cause a pressure sensitive means 22 to permit air to flow through a rate-of-flow restricting device 23 to the cylinder 9 so that piston 8 is caused to move compressing a return spring 24 and at the same time causing the section isolating valve 5 to move to the next position. At the limit of the forward travel of the piston 8, the cam 19 causes the pneumatic pilot valve 17 to operate and apply actuating pressure to the operating means by which the air cut-off valve 16 is moved to the cleaning position allowing the compressed air from the reservoir 18 to pass through the porous elements 2 of the isolated section in the form of a blast. As the pressure in the reservoir 18 falls, the piston 8 returns to normal under the action of its return spring 24, air from cylinder 9 being passed back at a controlled rate to the reservoir via the rate-of-flow restricting device 23 and a one-way valve 25 which bridges across the pressure sensitive means 22. When the return stroke movement finishes, the pneumatic pilot valve 17 releases the air cut-off valve 16 so that it restores itself to its normal position where it seals the exit from the reservoir 18 and provides a path for clean air from the isolated section of porous elements to pass to the exhaust 26 while the pressure in the reservoir is building up for the next operational cycle.

What I claim is:

1. An air filter of the type comprising porous elements arranged in sections which elements are cleaned by reverse-to-normal air flow, incorporating automatic means for the continuous cyclical cleaning of the elements in all sections, said automatic means comprising a source of comparatively high pressure air, an air storage reservoir, a pipe line connecting said source to said reservoir, a predetermined constriction in said pipe line for regulating the rate of growth of pressure within the reservoir, isolating valve gear on the filter for isolating in turn each section of the porous elements, a pressure operable driving device for operating said isolating valve gear, a pressure sensitive means associated with the reservoir for permitting air to flow from the reservoir to the pressure operable driving device to operate same when the pressure in the reservoir reaches a predetermined level, an air cut-off valve normally closing an air path from the reservoir to the isolating valve gear, means for opening said air cut-off valve on completion of the movement of the isolating valve gear to permit air stored in the reservoir to escape in the form of a blast through the isolated section of porous elements and means for restoring to normal the driving device of the isolating valve gear and the cut-off valve after the pressure in the reservoir has fallen to a second predetermined level.

2. A filter as claimed in claim 1 wherein the predetermined constriction is a manually adjustable control valve.

3. A filter as claimed in claim 1 wherein the cut-off valve in its normal position allows clean air from the isolated section to pass to a common exhaust for all sections.

4. A filter as claimed in claim 1, wherein a constriction is provided in the connection between the pressure sensitive means and the pressure operable driving device to limit the speed of operation of the latter.

5. A filter as claimed in claim 1 wherein the pressure operable driving device comprises a spring-returned pneumatically operated piston working in a cylinder to which the reservoir is connected, an extension on the piston rod, a pawl carried by said extension, the pawl engaging said isolating valve gear for operation thereof at each stroke of the piston.

6. A filter as claimed in claim 5 comprising a cam on the piston rod extension and a switch operable by the cam to control the operation of the air cut-off valve between the reservoir and the isolating valve gear.

7. A filter as claimed in claim 6 wherein the switch is a pneumatic switch which is supplied with air from said source of comparatively high pressure air.

8. A filter as claimed in claim 5, wherein a one-way valve is coupled across the pressure sensitive means to allow air from the driving device in returning to the normal position to pass back to the reservoir.

References Cited in the file of this patent
UNITED STATES PATENTS

| | | |
|---|---|---|
| 2,391,534 | Yerrick | Dec. 25, 1945 |
| 2,490,533 | McAlear | Dec. 6, 1949 |
| 2,723,726 | Pellon | Nov. 15, 1955 |
| 2,850,112 | Dru | Sept. 2, 1958 |

FOREIGN PATENTS

| | | |
|---|---|---|
| 441,252 | Germany | of 1927 |